United States Patent [19]
Holz

[11] 4,186,392
[45] Jan. 29, 1980

[54] TOUCH PANEL AND OPERATING SYSTEM

[75] Inventor: George E. Holz, North Plainfield, N.J.

[73] Assignee: Burroughs Corporation, Detroit, Mich.

[21] Appl. No.: 928,958

[22] Filed: Jul. 28, 1978

[51] Int. Cl.² .............................................. G08B 5/36
[52] U.S. Cl. ................................ 340/712; 340/365 C
[58] Field of Search ........................... 340/365 C, 712

[56] References Cited
U.S. PATENT DOCUMENTS

| | | | |
|---|---|---|---|
| 3,482,241 | 12/1969 | Johnson | 340/712 |
| 3,757,322 | 9/1973 | Barkan et al. | 340/712 X |
| 3,778,817 | 12/1973 | Silverberg | 340/365 C |
| 3,921,166 | 11/1975 | Volpe | 340/365 C |
| 4,017,848 | 4/1977 | Tannas | 340/712 X |
| 4,027,306 | 5/1977 | Hackmeister | 340/365 C |
| 4,037,225 | 7/1977 | Duvall | 340/365 C |
| 4,078,257 | 3/1978 | Bagley | 340/712 X |
| 4,110,749 | 8/1978 | Janko et al. | 340/712 X |

*Primary Examiner*—David L. Trafton
*Attorney, Agent, or Firm*—Kevin R. Peterson; Robert A. Green; Edward J. Feeney, Jr.

[57] ABSTRACT

The disclosure is of a display device having a face plate for displaying information and carrying an electrode assembly which is coupled to the face plate of the display device. The electrode assembly includes an insulating support sheet having an inner surface and an outer surface, on each of which an array of rows and columns of conductive areas is formed. On the inner surface, the rows of conductive areas are electrically connected together to output contact pads at a side edge of the sheet, and, on the outer surface, the columns of conductive areas are electrically connected together to output contact pads along the lower edge of the sheet. Each outer conductive area overlies and is capacitively coupled to an inner conductive area. A column conductor which extends from a contact pad at an edge of the outer surface of the sheet is intimately capacitively coupled to each column of outer conductive areas.

The system of the invention includes a microprocessor which drives the columns of conductive areas sequentially and senses the energization of one of these areas to provide display information on the display device.

4 Claims, 5 Drawing Figures

TOUCH PANEL AND OPERATING SYSTEM

BACKGROUND OF THE INVENTION

Touch-controlled panel or display devices and systems are known in the art, and U.S. Pat. Nos. 3,757,322; 3,482,241; and 3,696,409 are examples of such devices and systems. However, the touch panel described herein is different in construction than those in the prior art, and a novel drive system is provided for use therewith.

DESCRIPTION OF THE PREFERRED EMBODIMENTS

Figure 2:
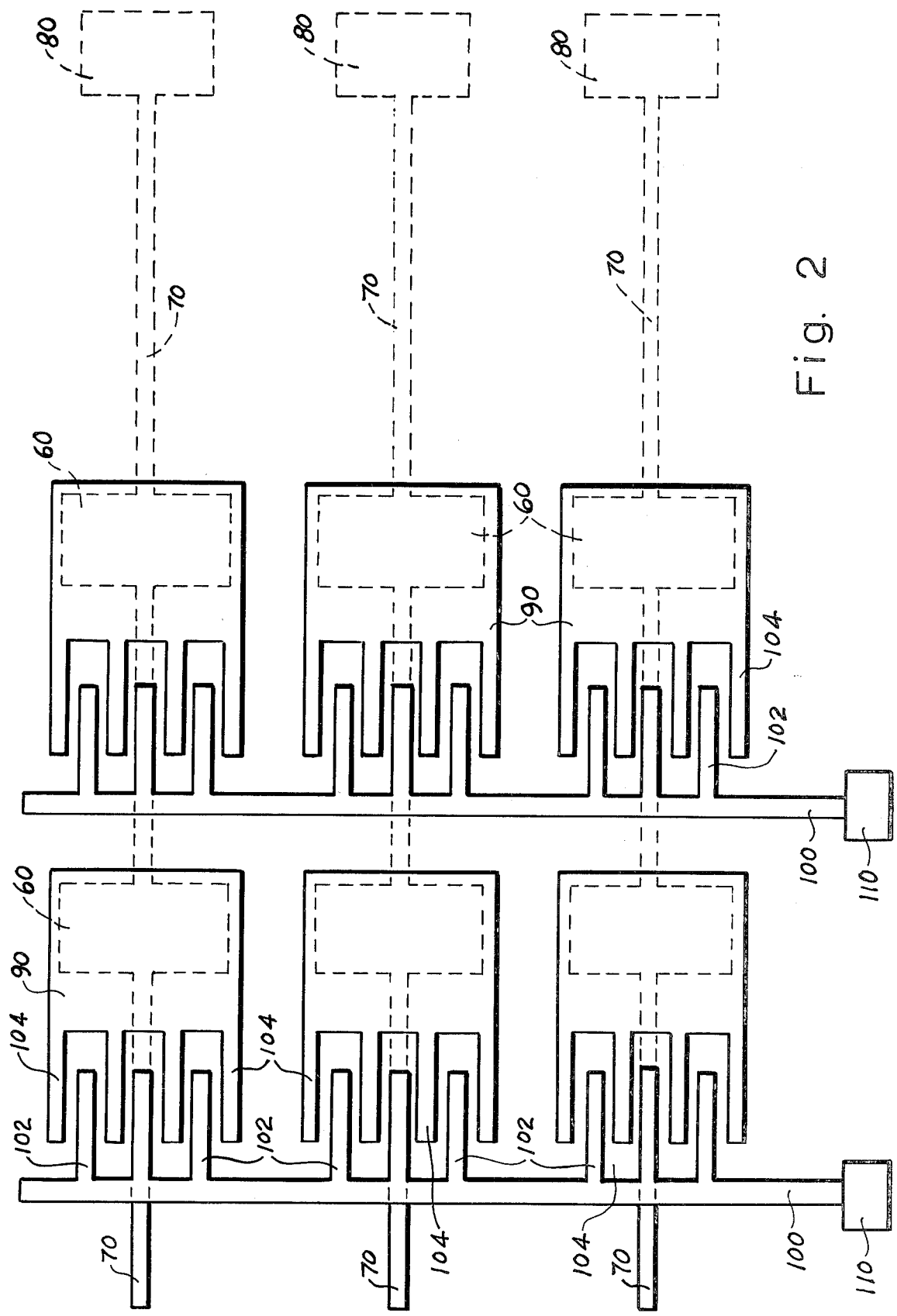
FIG. 2 is a plan view of the electrodes of the touch panel of FIG. 1.

Apparatus 10 embodying the invention comprises a display device, for example, a cathode ray tube 20 having a phosphor-coated face plate 30, with an electronic assembly or touch panel 40 embodying the invention secured to, or removably coupled to, the face plate but shaped to match the curvature of the face plate. The touch panel 40 includes a sheet of glass 32 having, on its inner surface, a transparent conductive layer 36 of tin oxide or the like which acts as a Radio Frequency Interference (RFI) shield. The assembly or touch panel 40 also includes a sheet 50 of insulating material, for example, glass, which carries on its inner surface 52 an array of transparent conductive film areas or electrodes 60 disposed in rows and columns. Each row of electrodes 60 is electrically connected by a conductor 70 (FIG. 2) to a contact pad 80 at an edge of the glass plate. The outer surface 54 of the glass plate is similarly provided with an array of rows and columns of transparent conductive film areas or electrodes 90, each area or key 90 overlying and aligned with one of the areas 60 on the inner surface. A column conductor 100, or strobe line, is provided for each column of conductive film areas and is capacitively coupled by means of conductive fingers 102 which are closely interleaved with, but are spaced from, conductive fingers 104 which extend from each of the outer areas as illustrated in FIG. 2. Each column conductor 100 extends to a conductive contact pad 110 at the lower edge of the glass plate.

The interleaving of the conductive fingers 102 and 104 provides efficient coupling between the column conductors 100 and the electrodes 90. A layer 42 of a clear dielectric is provided over the outer surface of plate 50 for insulating purposes.

The touch panel 40 is prepared according to a method described in an application by George Przybylek, the application being entitled Touch-Sensitive Display Panel and Method of Making It, filed concurrently herewith, and incorporated herein by reference. Briefly, the assembly 40 is prepared by coating both surfaces of a flat glass plate with a layer of indium-tin-oxide, screening resist patterns on the inner and outer surfaces, and then etching to provide the electrodes 60 and 90 described above. The layer 42 is provided, and the flat plate thus treated is placed in a suitably shaped mold, and it is heated sufficiently to cause it to sag to conform to the shape of the cathode ray tube face plate 30. In the past, such curved assemblies had to be formed by first curving the glass plate and then forming electrodes thereon; the art did not permit forming the electrodes on a flat plate and then curving the plate.

If desired, an anti-reflection coating 44 may be provided on the outer surface of the assembly 40.

The optimum relationship of the electrodes according to the invention, as illustrated in FIG. 2, shows the vertical or column conductors 100 and their horizontally projecting fingers 102, and the adjacent relatively large-area electrodes or keys 90 and their horizontally projecting fingers 104 which lie between the fingers 102. Also seen is a horizontal sense line 70 which lies beneath the area 90. In operation of the invention and with this arrangement of the electrode areas and conductors, maximum coupling of signal from the vertical conductor 100 to area 90, and minimum coupling from conductor 100 to the underlying sense conductors 70 are achieved. This permits an optimum amount of signal to be removed by the operator's finger and prevented from being coupled through to the sense line when a key 90 is touched.

Figures 1, 3:
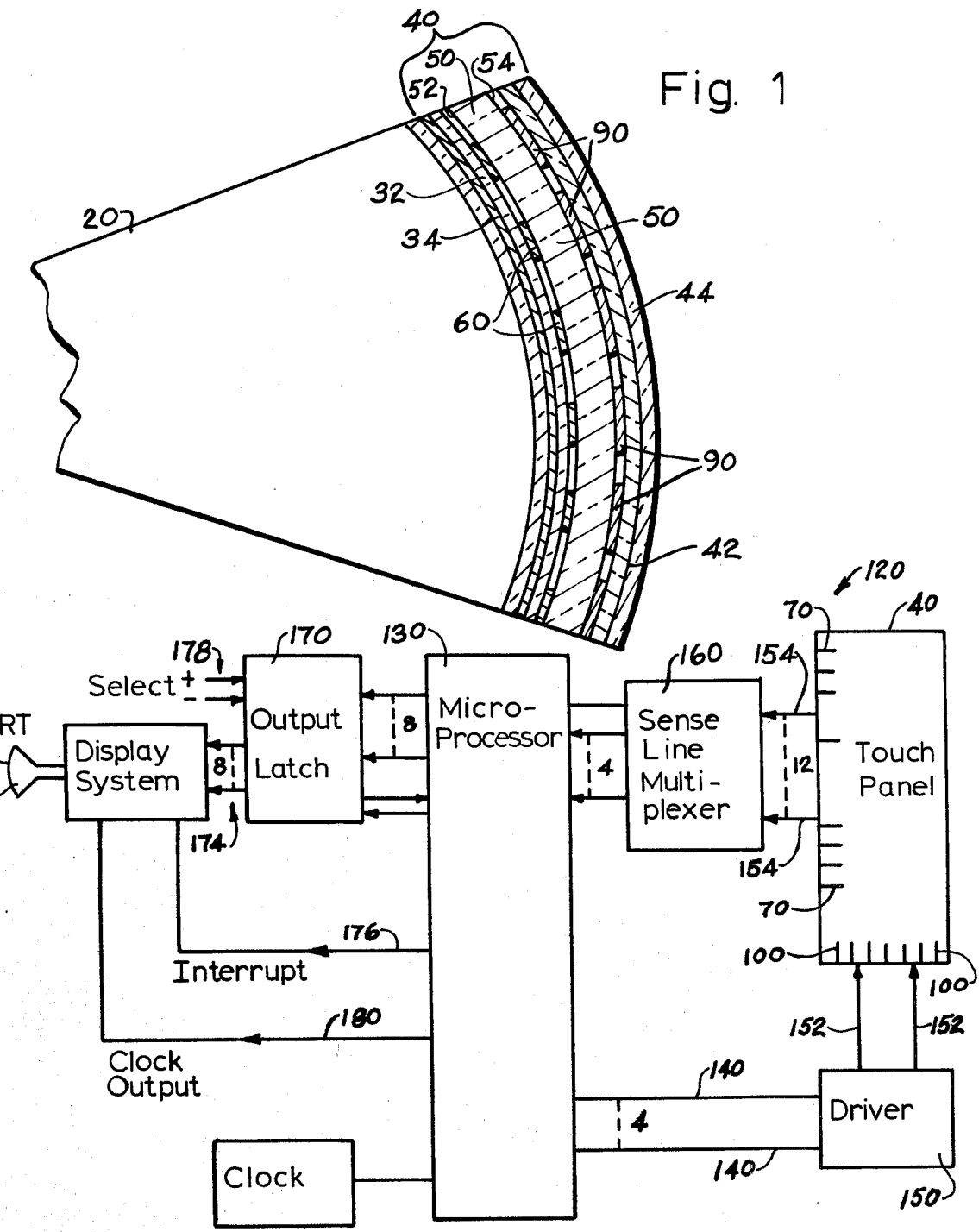
FIG. 1 is a sectional view of a cathode ray tube face plate and electrode assembly or touch panel embodying the invention.
FIG. 3 is a schematic representation, in block form, of the system of the invention.

The system 120 of the invention is shown in block diagram in FIG. 3 and includes a microprocessor 130 having output leads 140 which are coupled to a driver 150 having an output lead 152 coupled to each vertical conductor 100. The driver 150 is adapted to apply a strobe signal to each of the columns 100 in turn. As each column receives an energizing pulse, the previous column is driven in the oposite direction. In the system, each sense line or row conductor 70 is also coupled by leads 154 to a sense line multiplexer 160 which is adapted to select the line associated with the conductive area or key 90 which has been selected by an operator. The output of the multiplexer 160 is coupled to the microprocessor 130 which is adapted to couple the line and column information to an output latch 170 and thence to the CRT display system 172 which stores the information selected for display on the cathode ray tube 173.

Figure 4A:
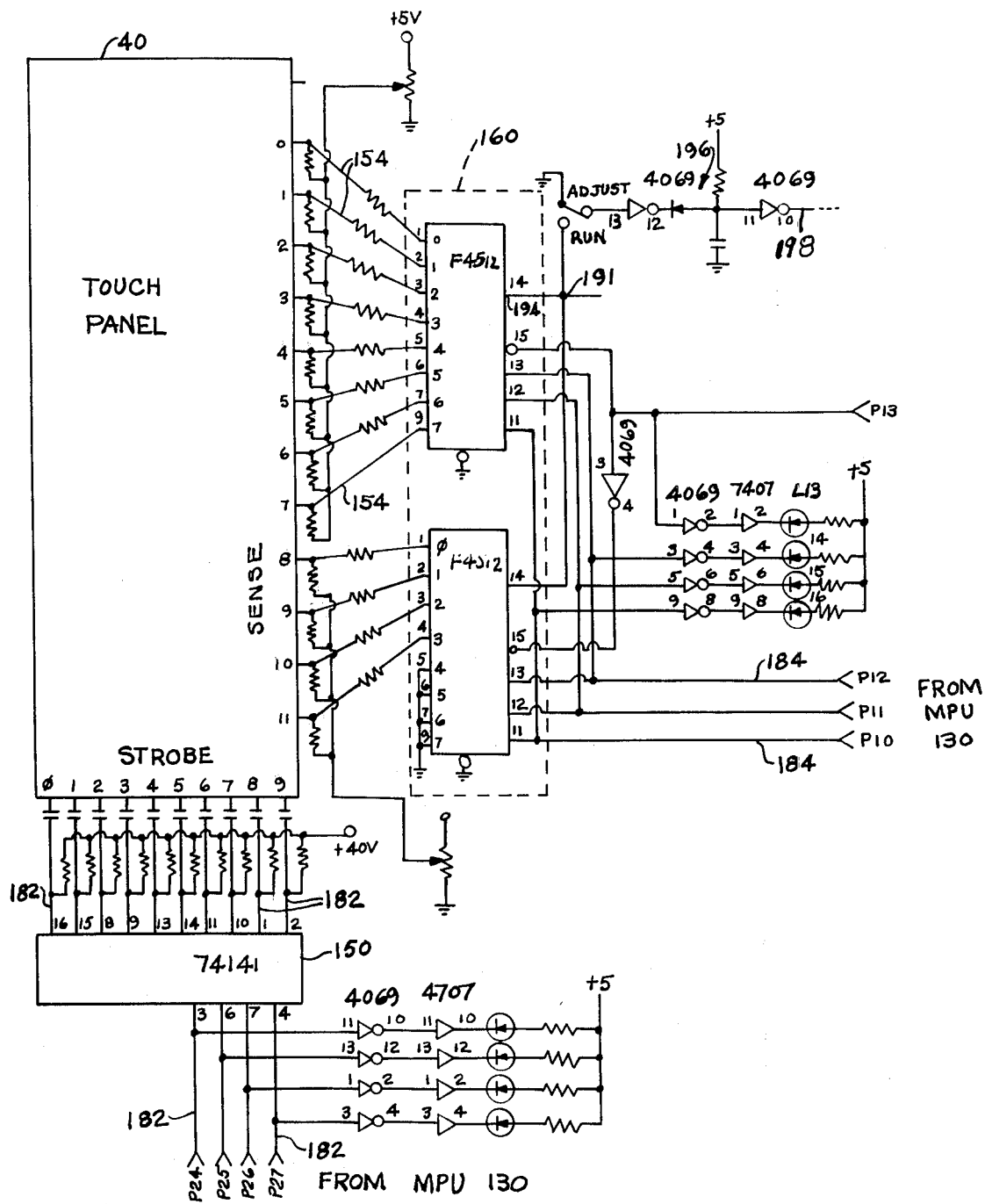
FIGS. 4A and 4B are a more detailed schematic representation of the system of the invention.
Figure 4B:
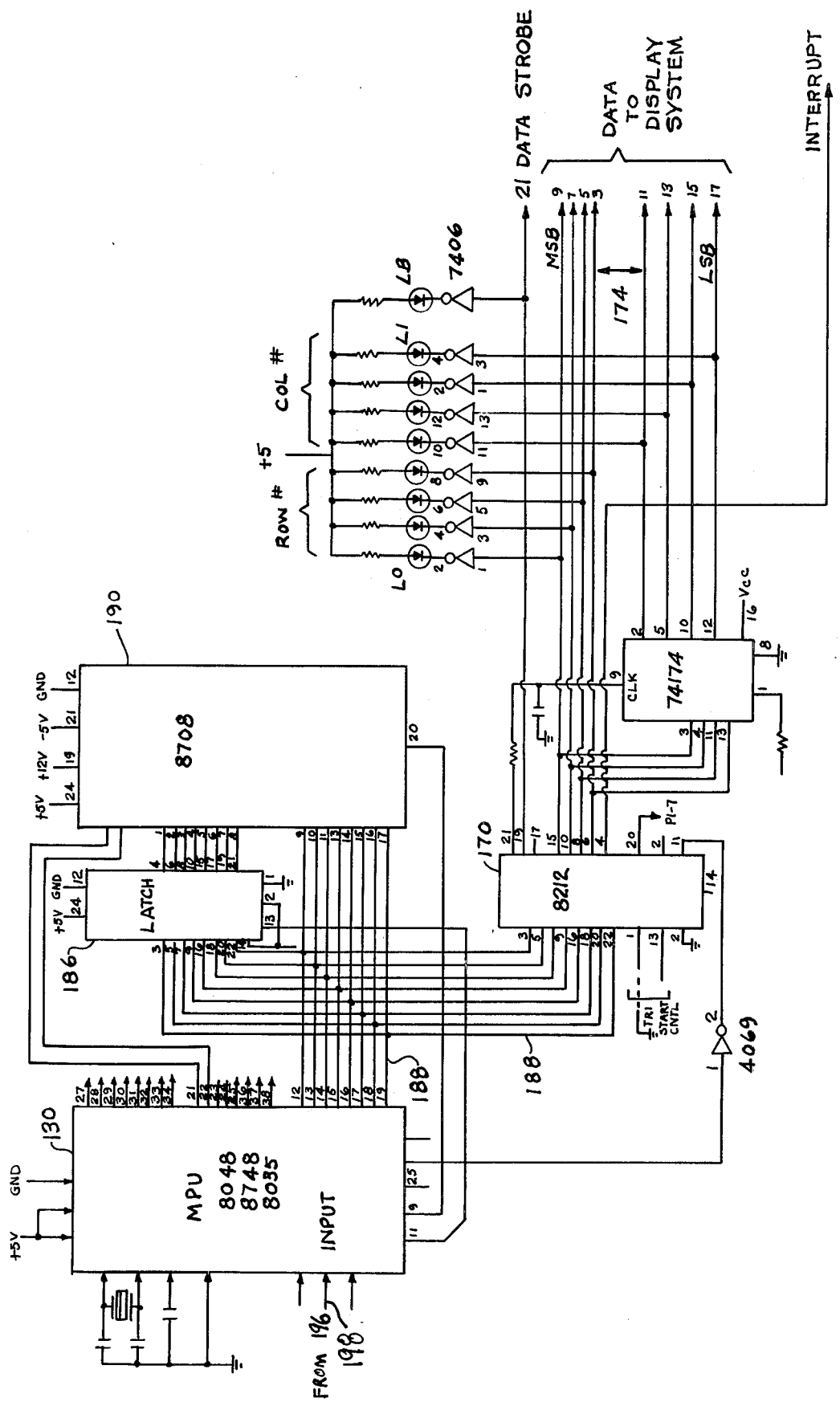

The system of the invention, shown in greater detail in FIGS. 4A and 4B, includes touch panel 40 and its row sense lines 154 connected to sense line multiplexer 160. The multiplexer 160 comprises two F4512 chips. The system also includes microprocessor unit 130 which has leads 182 to the driver 150 and leads 184 to the output of the multiplexer 160. The microprocessor 130 has connections 188 to an 8708 memory 190 and to latch 170. The memory 190 also has connections 192 through a latch 186 to the leads 188 to latch 170. The output latch 170 has 8-line data bus 174 which is coupled to the display system 172 shown in FIG. 3.

Under the control of the microprocessor 130, generally positive pulses of about 40 volts are applied sequentially and continuously to the leads 182 and the column conductors 100 in the touch panel 40. If none of the keys or conductive areas 90 is touched by an operator, no output is seen on any of the row conductors. However, if a key is touched, it unbalances the panel so that, by way of capacitive coupling, a pulse appears on the selected row conductor 70. This produces an analog signal on the selected lead 154, and this, when applied to the digital multiplexers 160, produces a digital output at terminal 194. This output signal is passed through a noise rejection circuit 196 and is coupled by lead 198 to the input of the microprocessor 130. When the microprocessor receives such a signal, it interrupts the routine of scanning the column conductors and changes this routine to scanning the conductors surrounding the selected key 90 to verify that the key has been touched. Once this has been verified, the microprocessor 130 puts out two bytes of information, one for the X or row position and one for the Y or column position of the selected key, and this information is applied to the latch 170. The latch then provides an output signal on leads 174 to the display system 172 which couples the requested information from its memory and displays it on the display screen of the cathode ray tube 173.

What is claimed is:

1. A touch panel display system comprising
a display device for displaying information,
a touch panel in operative relation with said display device,
said touch panel including
   (1) an insulating support plate having an inner surface and an outer surface,
   (2) an array of rows and columns of first conductive areas on the inner surface of said support plate, each row of said first conductive areas being connected by a row conductor to a row terminal,
   (3) an array of rows and columns of second conductive areas on the outer surface of said support plate, each second area overlying a first area and being capacitively coupled thereto, each column of said second conductive areas being connected by a column conductor to a column terminal,
electronic circuit means coupled to said touch panel including
first means coupled to said column conductors for applying a strobe signal to each in turn and continuously,
second means coupled to each row conductor for receiving an output signal when one of said second conductive areas is touched by an operator,
third means for generating coordinate information from said output signal, and
fourth means for coupling said coordinate information to a display system wherein information is stored for display on said display device.

2. A touch panel display system comprising
a touch panel, coupled to the viewing screen of a display device, and having an array of rows and columns of first transparent conductive electrodes on its outer surface and a similar array of second transparent conductive electrodes on its inner surface,
a column conductor coupled to the columns of outer first electrodes and a row conductor coupled to the rows of inner second electrodes,
a microprocessor,
first means in said microprocessor coupled to said column conductors for applying a signal to each in turn and continuously for strobing said columns of first electrodes sequentially,
second means in said microprocessor for receiving an output signal when one of said first electrodes is touched by an operator,
a multiplexer coupled between all of said row conductors and second means in said microprocessor for providing said output signal for said second means,
third means in said microprocessor for generating coordinate information from said output signal and identifying said one touched first electrode, and
fourth means for coupling said coordinate information to a display system wherein information is stored for display on said device and the selected stored information is coupled to and displayed on said display device.

3. The apparatus defined in claim 2 and including a latch circuit between said microprocessor and said display system.

4. The system defined in claim 2 wherein said microprocessor includes fifth means for strobing said columns of first electrodes to strobe only the electrodes adjacent to the one electrode selected by an operator.

* * * * *